United States Patent [19]
Schultz et al.

[11] Patent Number: 6,122,901
[45] Date of Patent: Sep. 26, 2000

[54] ADHESIVE BANDAGE FOR ANIMAL FOOT

[76] Inventors: Elaine S. Schultz, 4659 Tipton Dr., Troy, Mich. 48098; Karen M. Magner, 2356 E. Cook Rd., Grand Blane, Mich. 48439

[21] Appl. No.: 09/120,566

[22] Filed: Jul. 22, 1998

Related U.S. Application Data

[60] Provisional application No. 60/053,393, Jul. 22, 1997.

[51] Int. Cl.[7] .................................. A61D 9/00; A01L 3/00
[52] U.S. Cl. ............................................. 54/82; 168/27
[58] Field of Search .............................. 54/82; 168/2, 17, 168/26, 27, DIG. 1

[56] References Cited

U.S. PATENT DOCUMENTS

| | | | |
|---|---|---|---|
| 330,241 | 11/1885 | Keagle | 168/2 |
| 359,897 | 3/1887 | Shurtz . | |
| 630,310 | 8/1899 | Agnew . | |
| 858,272 | 6/1907 | Fennell . | |
| 1,101,759 | 6/1914 | Salter . | |
| 1,212,266 | 1/1917 | Schrader et al. | 168/DIG. 1 X |
| 1,442,748 | 1/1923 | Trauger . | |
| 2,028,674 | 1/1936 | Larson . | |
| 2,163,361 | 6/1939 | Ford et al. | 168/2 |
| 2,424,172 | 7/1947 | Huddleston | 36/2.5 |
| 2,651,853 | 6/1953 | Lewis | 36/2.5 |
| 3,118,449 | 1/1964 | Bane | 128/336 |
| 3,486,561 | 12/1969 | Kulak | 168/4 |
| 3,494,422 | 2/1970 | Clark | 168/4 |
| 3,520,107 | 7/1970 | Haryett et al. | 54/82 |
| 3,732,929 | 5/1973 | Glass | 168/18 |
| 4,185,695 | 1/1980 | Hancock | 168/18 |
| 4,290,487 | 9/1981 | Unger | 168/18 |
| 4,444,269 | 4/1984 | Laurent | 168/1 |
| 4,456,001 | 6/1984 | Pescatore | 128/1.5 |
| 4,503,914 | 3/1985 | Voland | 168/18 |
| 4,548,026 | 10/1985 | Shidner | 54/82 |
| 4,736,800 | 4/1988 | Rohner | 168/18 |
| 4,962,731 | 10/1990 | Wexler . | |
| 4,981,010 | 1/1991 | Orza et al. | 54/82 |
| 5,105,892 | 4/1992 | Seesholtz | 168/27 |
| 5,129,461 | 7/1992 | Igrow | 168/4 |
| 5,176,221 | 1/1993 | Aprill | 168/18 |
| 5,199,498 | 4/1993 | Knudsen | 168/28 |
| 5,209,048 | 5/1993 | Hanson | 54/82 |
| 5,224,549 | 7/1993 | Lightner | 168/18 |
| 5,272,857 | 12/1993 | Logan | 54/82 |
| 5,528,885 | 6/1996 | Chamberlain | 54/82 |
| 5,546,735 | 8/1996 | Brooks | 54/82 |
| 5,600,940 | 2/1997 | Rice | 54/82 |
| 5,638,905 | 6/1997 | Sigafoos et al. | 168/17 |

FOREIGN PATENT DOCUMENTS

| | | | |
|---|---|---|---|
| 2492221 | 4/1982 | France | 54/82 |
| 2247602 | 3/1992 | United Kingdom | 168/17 |

OTHER PUBLICATIONS

Christine Barakat, "Which Boot? Which Wrap? 4 steps to choosing the best protective gear for keeping your horse's legs out of harm's way." Equus 237, Jul. 1997, pp. 55–64.

"Pack It In" Practical Horseman, Mar. 1998, p. 42.

*Primary Examiner*—Robert P. Swiatek
*Attorney, Agent, or Firm*—Gifford, Krass, Groh, Sprinkle, Anderson & Citkowski, P.C.

[57] ABSTRACT

A bandage for an animal's foot includes a center portion which is designed to be placed on the bottom of the animal's foot and to cover the bottom of the foot. The bandage also includes multiple attachment tabs which extend outwardly from the perimeter of the center portion of the bandage. The tabs are designed to be bonded to the side of the animal's foot and thereby to retain the center portion of the bandage against the bottom of the animal's foot.

13 Claims, 3 Drawing Sheets

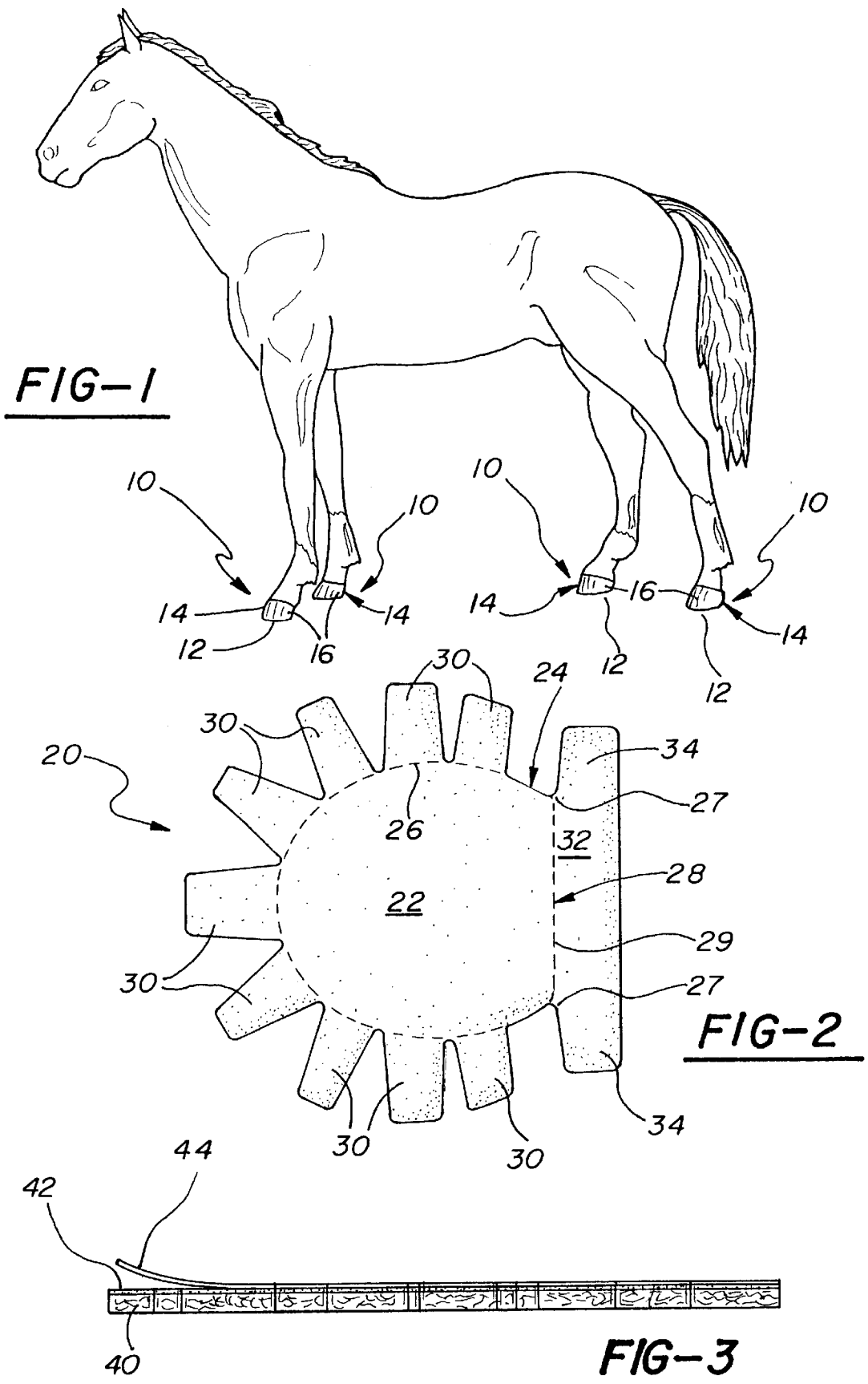

ADHESIVE BANDAGE FOR ANIMAL FOOT

CROSS-REFERENCE TO RELATED APPLICATION

This application claims the benefit of U.S. Provisional Application having Serial No. 60/053,393 filed Jul. 22, 1997.

FIELD OF THE INVENTION

The present invention relates generally to bandages for animals, and more particularly to a bandage for an animal's foot.

BACKGROUND OF THE INVENTION

For optimal health and performance, a horse's hooves must be properly cared for. Many varieties of horse shoes are available for protecting the hooves during normal use. However, if a hoof is injured, it is necessary to cover some or all of the hoof to protect it and allow healing. It may also be necessary to use a covering capable of holding medication in contact with the bottom of the hoof. The horse's hoof consists of a central fleshy portion called a frog and a surrounding bony horn. Following an injury, either the frog or the horn itself may require a covering.

Typically, a reusable boot made out of leather, rubber, plastic or cloth is placed around the hoof so that it covers the frog and the horn and extends upwardly to the lower portion of the horse's leg. These reusable boots are typically secured in place using separable hook and loop fastener material, cable wires, belts, and/or laces. Some of these reusable boots are capable of protecting the hoof when the hoof is used on hard surfaces by acting as a plastic shoe or covering for the hoof. Therefore, the horse may be ridden or used while wearing one of these reusable boots. The reusable boot may also be used to retain a gauze or poultice between the boot and the hoof for treatment of the injured hoof. Some examples of reusable boots are shown in the following patents: U.S. Pat. No. 330,241 to Keagle; U.S. Pat. No. 630,310 to Agnew; U.S. Pat. No. 2,163,361 to Ford et al.; U.S. Pat. No. 5,209,048 to Hanson; and U.S. Pat. No. 5,528,885 to Chamberlain. These reusable boots suffer from the drawback that they are costly and must be thoroughly cleaned between uses to prevent the spread of infection or disease. The boots may also be heavy and uncomfortable for the horse and often do not stay in place while on the horse's hoof. If the boot slips off or dislodges, the horse may be injured.

Often, the horse is not ridden while the hoof is healing and therefore a bulky reusable boot is not necessary or desirable. What is needed is a simple, less bulky covering for the hoof. Current practice when an injured horse is to be stabled is to wrap the hoof with adhesive veterinary wrap or duct tape to cover the hoof and to hold medication. The procedure is illustrated in the March 1998 issue of Practical Horsemen Magazine, page 42. This approach is messy, time consuming, and the tape is difficult to remove. The horse may find the wrapping and removal process irritating and there is a danger that the horse may kick during the process. Therefore, there is a need for a simple, disposable hoof covering. It is also desirable that such a hoof covering be inexpensive.

SUMMARY OF THE INVENTION

There is disclosed herein a bandage for use on an animal's foot having a bottom and a side. The bandage includes a center portion which is configured to be disposed adjacent the bottom of the animal's foot and to cover the bottom of the foot. The center portion of the bandage has a perimeter and multiple attachment tabs which extend outwardly from this perimeter. The tabs are configured to be bonded to the side of the animal's foot to retain the center portion of the bandage adjacent the bottom of the animal's foot. In some embodiments, this perimeter comprises an arcuate section with a pair of ends and a generally straight section interconnecting the ends. The generally straight section defines the rear edge of the center portion. In these embodiments, an attachment bar is joined to the rear edge of the center portion at one of its lengthwise edges. The attachment bar is designed to be folded upwardly onto the rear of the animal's foot with at least a portion of the attachment bar designed to be bonded to the side of the animal's foot.

BRIEF DESCRIPTION OF THE DRAWINGS

FIG. 1 is a side view of a horse;

FIG. 2 is a plan view of a bandage according to the present invention;

FIG. 3 is a side view of the bandage of FIG. 2;

DETAILED DESCRIPTION OF THE DRAWINGS

Figure 5:
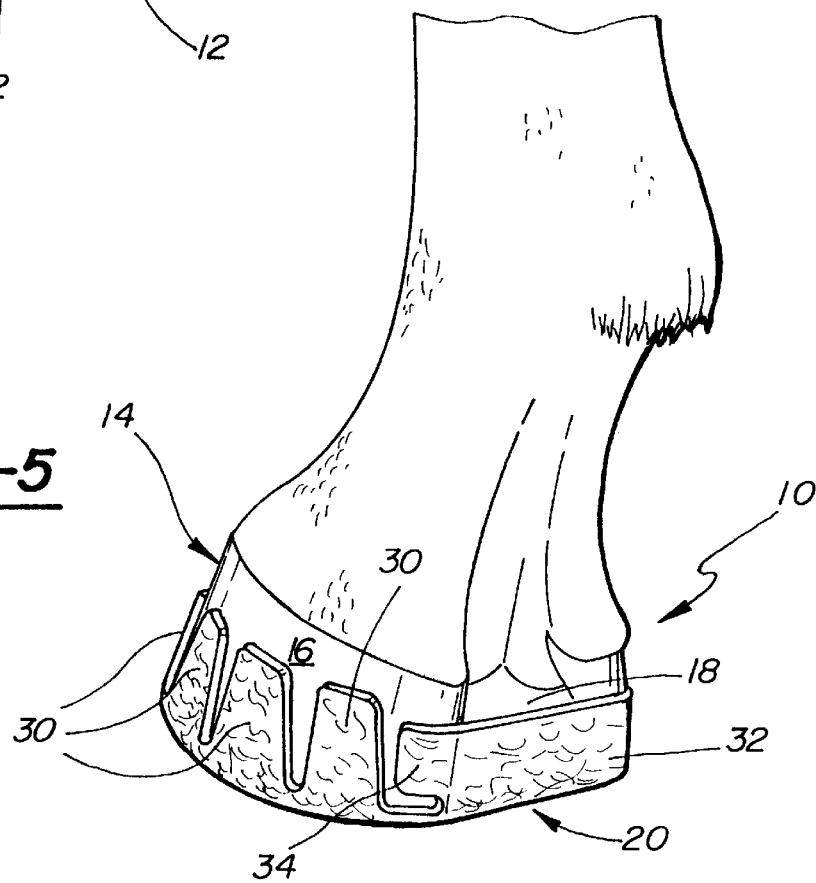
FIG. 5 is a rear three-quarter view of a horse's hoof with a bandage according to the present invention applied thereto.

Odd toed ungulates, such as horses, zebras, and donkeys, have hooves 10 as generally shown in FIG. 1. These animals contact the ground with a portion of the bottom 12 of each hoof 10. Each hoof 10 includes a central fleshy portion, called a frog, and a surrounding bony horn 14 which is essentially a large and heavy duty toenail. The lower edge of the horn 14 and the frog both form part of the bottom 12 of the hoof 10. The horn 14 defines most of the side 16 of the hoof 10 but does not extend all the way around, as shown in FIG. 5. At the rear of the hoof 10, the horn 14 is interrupted and the side 16 of the hoof 10 is defined by a fleshy area 18.

The horn 14 or the frog of the hoof 10 may become damaged for a variety of reasons. For example, the frog may become lacerated, bruised, or infected. Also, the horn 14 may become chipped or cracked or may become overly dry. Any of these conditions may require that the hoof 10 be covered and/or medicated to allow healing. For example, it may be desirable to place a piece of gauze or a poultice against the underside of the hoof 10 and to retain it in that position to encourage healing.

Referring now to FIG. 2, a bandage according to the present invention is generally illustrated at 20. The bandage 20 is designed to be used to cover the bottom 12 of a hoof 10 and may be used to retain a piece of gauze or a poultice on the underside of the hoof 10. The bandage 20 has a center portion 22 which is generally hoof shaped. By hoof shaped, it is meant that the perimeter 24 of the center portion corresponds to the outline of the bottom 12 of a hoof 10. The perimeter 24 has an arcuate section 26 with a pair of ends 27 and a generally straight section 28 interconnecting the ends 27. The generally straight section 28 of the perimeter 24 defines the rear edge 29 of the center portion 22. The perimeter 24 of the center portion 22 can also be described as a truncated oval.

Extending radially outwardly from the arcuate section 26 of the perimeter 24 are a plurality of tabs 30. In the illustrated embodiment, nine of these tabs 30 extend radially outwardly from the arcuate perimeter section 26, although more or fewer tabs 30 could be provided. An attachment bar 32 is joined to the rear edge 29 of the center portion 22. This attachment bar 32 has a length greater than its width and is joined at one of its lengthwise edges to the rear edge 29 of the center portion 22. Therefore, the lengthwise dimension of the attachment bar 32 is generally parallel to the rear edge 29 of the center portion. The attachment bar 32 is longer than the generally straight section 28 of the perimeter 24 and therefore extends beyond both ends 27 of the arcuate section 26. In other words, the attachment bar 32 extends beyond both sides of the rear edge 29 of the center portion 22. The portions of the attachment bar 32 extending beyond the ends 27, or sides of the rear edge 29, define attachment portions 34.

Referring now to FIG. 3, a side view of the bandage 20 is shown. The bandage 20 includes a layer of bandage material 40. The bandage material 40 is preferably coated with an adhesive 42 so that the bandage 20 may be applied to a hoof 10 without the need to pretreat the bandage with a separate adhesive. The adhesive 42 is preferably a self sticking, pressure sensitive adhesive that does not require wetting to activate. In the preferred embodiment, the adhesive layer 42 is covered by a release layer 44. The release layer 44 covers the adhesive 42 to prevent premature contamination. The release layer 44 may be any of a variety of materials such as wax paper which may be easily removed from the adhesive layer 42 when the bandage 20 is to be used. The entire surface of the center portion 22, the tabs 30, and the attachment bar 32 may be coated with the adhesive layer 42 or, alternatively, only portions of the bandage 20 may be coated with adhesive 42. For example, only the tabs 30 and portions of the attachment bar 32 may be coated with an adhesive.

Figure 4:
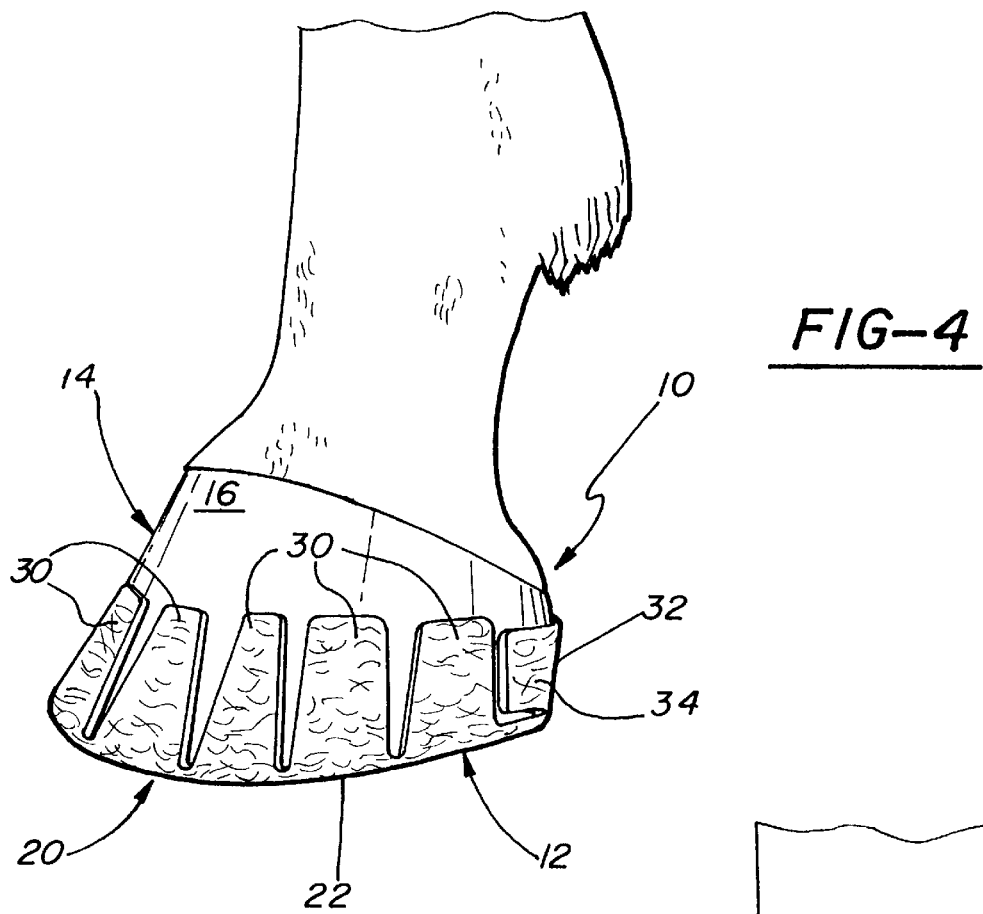
FIG. 4 is a side view of a horse's hoof with a bandage according to the present invention applied thereto.

Referring now to FIGS. 4 and 5, the bandage 20 is shown applied to the hoof 10. As shown, the center portion 22 of the bandage 20 is held against the bottom 12 of the hoof 10 by the plurality of tabs 30 which are bonded to the side 16 of the hoof 10. The tabs 30 and at least a portion of the attachment bar 32 are bonded to the side 16 of the hoof 10 by the pressure sensitive adhesive 42 as discussed earlier. Because the tabs 30 and the attachment bar 32 are bonded to the side 16 of the hoof 10, the center portion 22 is retained against the bottom 12 of the hoof 10, whether or not the center portion 22 is coated with adhesive. Nonetheless, an adhesive layer 42 is desirable on the center portion 22 for some applications. The adhesive layer 42 on the center portion 22 makes the bandage 20 more secure and may also be used to secure a piece of gauze or a poultice to the bandage 20 prior to application. As can be seen, the tabs 30 and attachment bar 32 are configured such that they do not overlap one another. This is a preferred arrangement. With the preferred adhesive 42 and bandage material 40, the tabs 30 and attachment bar 32 bond easily to the horn 14 of the hoof 10 but do not easily stick to one another. Therefore, if the tabs 30 and attachment bar 32 were allowed to overlap, the overlapping portions would not be securely attached and would provide loose edges where the bandage 20 could begin to work loose. To achieve the nonoverlapping configuration, some of the tabs 30 are configured as truncated triangles with the bases of the truncated triangles adjacent the perimeter 24 of the center portion 22 of the bandage 20.

As shown in FIGS. 4 and 5, the attachment bar 32 is designed to attach the rear of the bandage 20 to the rearmost portion of the hoof 10. As best shown in FIG. 5, the side 16 of the hoof 10 has a portion at its rear which is not defined by bony horn 14 of the hoof 10. The portion of the side 16 of the hoof 10 not defined by the horn 14 is a fleshy area 18 to which bandage material 40 does not easily bond. The attachment bar 32 is provided to allow the bandage 20 to be securely attached to the rear of the hoof 10. The bandage 20 is first positioned such that the rear edge 29 of the center portion 22 is adjacent the rear of the hoof 10. The attachment bar 32 is then folded upwardly where it joins the rear edge 29 of the center portion 22. The attachment portions 34 of the attachment bar 32 extend a short distance around the hoof 10 to where they can bond securely with the horn 14 adjacent the fleshy area 18 at the rear of the hoof 10. As discussed earlier, the attachment bar 32 and the tabs 30 are positioned such that they do not overlap. As shown, the tabs 30 are arranged adjacent one another continuously around the arcuate section 26 of the perimeter 24 but stop a short distance away from the ends 27. This leaves a portion of the horn 14 adjacent the fleshy portion 18 which is not covered by a tab 30. The attachment portions 34 of the attachment bar 32 occupy this location when the bandage 20 is affixed to the hoof 10.

Various materials may be used to form a bandage 20 according to the present invention but several characteristics of the chosen materials must be taken into consideration. Permeability is one important consideration. Where the frog of the hoof 10 is infected, it may be desirable to use a porous bandage so that infected material can drain from the injured hoof 10. In other applications, it is desirable that the bandage material be impermeable. For example, it is sometimes necessary to hold a wet poultice in contact with the underside of a hoof 10 to moisturize the horn 14. In this situation, it is desirable to prevent moisture from passing through the bandage. Therefore, different amounts of permeability are desirable for different applications and different materials and combinations of materials are used depending upon the desired permeability of the bandage. The strength and durability of the chosen material is also important. The preferred embodiment of the bandage 20 is primarily designed for use on the hoof 10 of a horse that is not to be ridden. However, even a stabled horse exerts a significant load and significant amounts of wear on its hoof. Therefore, any bandage material to be used on the underside of a hoof 10 must be sufficiently tough to withstand the force and wear it will encounter. It is also desirable that the material not be overly slick or the horse may be injured due to slipping hooves. There are also situations where a bandage may be used on a horse that is not kept stabled. For example, as an injured hoof heals it may be desirable to exercise the horse to a limited degree. However, the wound may still require a bandage to protect it. Therefore, the bandage material is preferably strong enough to tolerate use during at least limited exercise. The bandage 20 may also be used to temporarily hold a loose horseshoe in place on the bottom 12 of hoof 10. Once again, the bandage material 40 must be sufficiently strong to tolerate such use.

Figure 6:
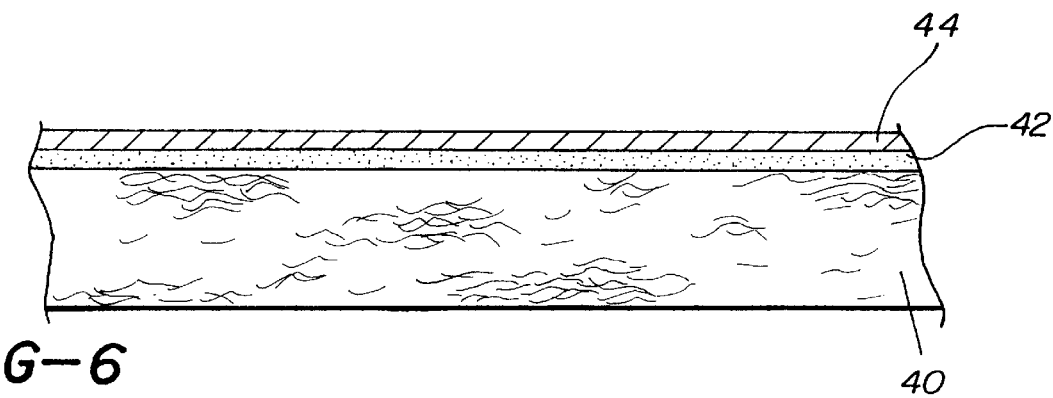
FIG. 6 is a cross-sectional view of a portion of one embodiment of a bandage according to the present invention.
Figure 7:
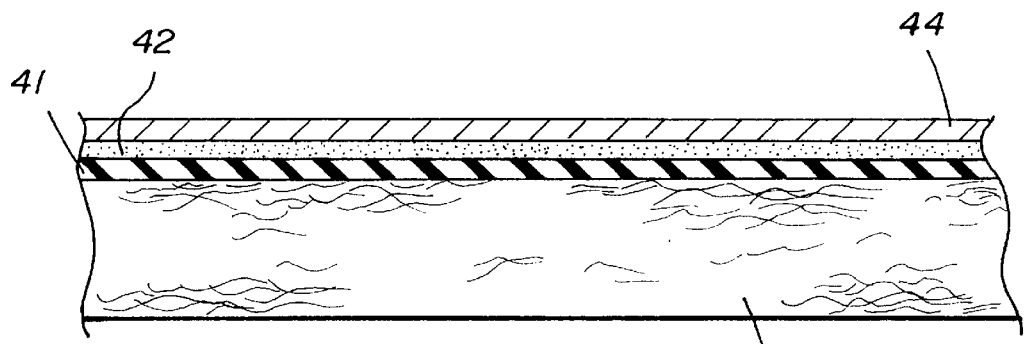
FIG. 7 is a cross-sectional view of a portion of a second embodiment of a bandage according to the present invention.

Referring now to FIGS. 6 and 7, the materials forming the preferred embodiments of the bandage 20 will be discussed in more detail. The bandage material 40 is preferably a non-woven synthetic material of sufficient density and thickness to tolerate the loads encountered in use on a hoof 10. One preferred material is a needled polypropylene. This a tough, nonwoven material similar in appearance to thick felt or thin carpeting. This material by itself is highly permeable but can be treated to reduce or nearly eliminate its permeability. The thickness of the material 40 is also important. Needled polypropylene that is too thin is insufficiently strong to survive normal wear and tear on the hoof 10 of even a stabled horse. Material 40 that is too thick is insufficiently foldable to allow the tabs 30 of the bandage 20 to be folded upwardly and bonded to the side 16 of the hoof 10. Preferably, the material is between approximately one-eighth and one-quarter of an inch thick. The most preferred material has a weight of approximately ten ounces per square foot. Obviously, other weights and thicknesses of materials, as well as other materials, may also be used as will be clear to one of skill in the art.

Needled polypropylene is available from a variety of manufacturers. Two manufacturers known to produce needled polypropylene suitable for the current application are Foss Manufacturing and Troy Mills. Both provide ten ounce per square foot needled polypropylene under bulk number 293–099.

In FIG. 6, the bandage material 40 is coated with an adhesive 42 which is in turn covered by a release layer 44. Preferably, the adhesive is sufficiently strong to securely hold the bandage 20 in place on the hoof 10 but also allows for removal of the bandage 20 without tools or solvents. One preferred adhesive is available from BF Goodrich under part number PL919PSA. The rate of application of adhesive may be varied. One known workable rate for the BF Goodrich adhesive is to spread the adhesive in a thickness corresponding to two ounces per square foot of bandage material. The adhesive coating on the bandage material 40 greatly reduces the permeability of the needled polypropylene. For applications where high permeability is desirable, the adhesive layer 42 may be omitted on the center portion 22 of the bandage 20. Alternatively, the adhesive layer 42 may be pattern coated on some or all of the bandage material 40 so that permeability remains. Also alternatively, the bandage material 40 and the adhesive layer 42 may be perforated to provide permeability.

Referring now to FIG. 7, an alternative embodiment construction of the bandage 20 is shown. In this embodiment, the bandage material 40 is back coated with a layer of impermeable material 41 such as a rubber or latex material. The impermeable material 41 is in turn coated with the adhesive layer 42 which is in turn covered by release layer 44. This embodiment creates a generally impermeable bandage 20 suitable for applications where moisture should be held in contact with the hoof 10. This embodiment may also be modified to provide some level of permeability by either pattern coating the impermeable material 41 onto the needled polypropylene or by perforating the material to provide small holes.

Figure 8:
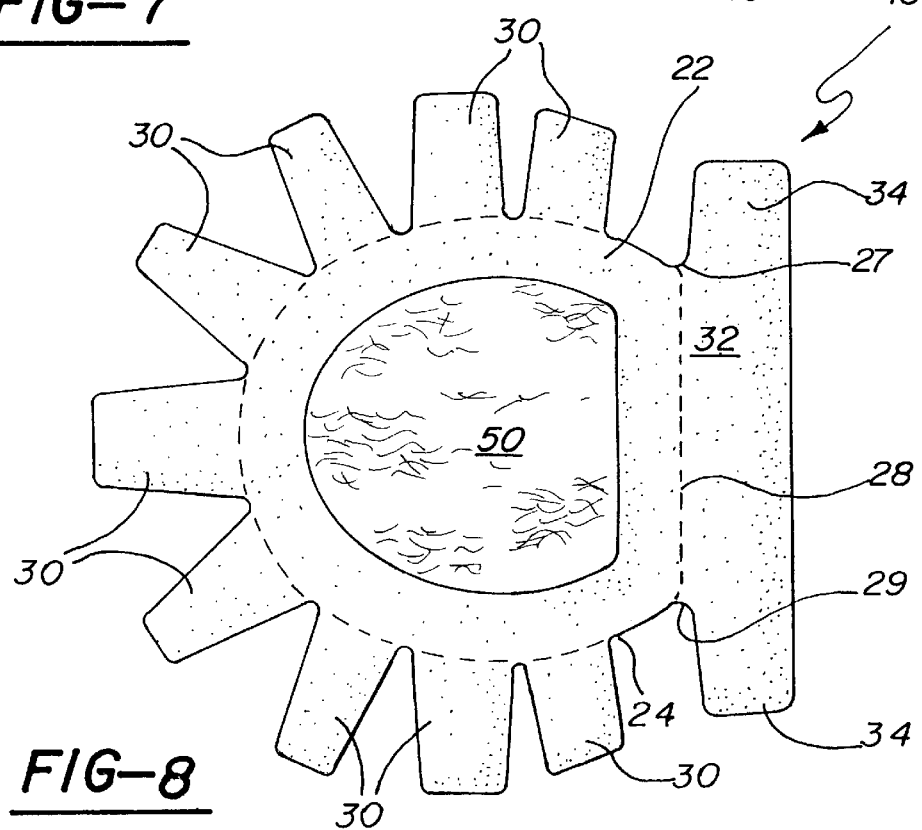
FIG. 8 is a plan view of an alternate embodiment of a bandage according to the present invention with an optional central pad.

Referring now to FIG. 8, another embodiment of a bandage 48 according to the present invention is shown. This embodiment differs only in that a pad 50 is fixed to the center of the center portion 22 of the bandage 48. This pad 50 may be used to hold medication or moisture. In some applications, it may be desirable to use such a preattached pad 50, especially where quick and easy treatment is desired. The pad 50 may also be pretreated with medication. A release layer would preferably be used to cover the pad 50 and the remainder of the bandage 48.

As will be clear to one of skill in the art, the bandage 20 is preferably provided in several sizes to accommodate variations in hoof size. The sizing system often used for horseshoes assigns one of the following sizes to a hoof: 00, 0, 1, 2, or 3. 00 is used for very small hooves. 0 or 1 means the hoof is medium sized and 2 or 3 is used for large hooves. For a medium (0 or 1) hoof, the center portion 22 of the bandage 20 preferable has a front to rear length of approximately 5 inches and a side to side width, at the widest point, of approximately 5 inches. The center portion 22 of a bandage 20 for a small (00) hoof is preferably ½ to 1 inch shorter and narrower while for a large (2 or 3) hoof it is preferably ½ to 1 inch longer and wider. Obviously, both larger and smaller sizes may be provided for animals such as ponies and Clydesdales. Bandages 20 may also be reshaped to accommodate hooves with different silhouettes. As will be clear to one of skill in the art, bandages according to the present invention may be used for animals other than odd toed ungulates with only minor modifications.

Having thus described the various embodiments of the present invention with reference to the accompanying figures, it will be appreciated that various changes and modifications can be made without departing from the scope or spirit of the invention.

We claim:

1. A bandage for an animal's foot having a bottom and a side, the bandage comprising:

a center portion configured to be disposed adjacent the bottom of the animal's foot and for covering the bottom of the foot, said center portion having a perimeter comprising an arcuate section with a pair of ends and a generally straight section interconnecting said ends, said generally straight section defining a rear edge of said center portion; and a plurality of attachment tabs extending outwardly from said arcuate section of said perimeter, said tabs configured to be bonded to the side of the animal's foot for retaining said center portion adjacent the bottom of the animal's foot; and an attachment bar having a length and a width, said bar having at least one lengthwise edge, at least a portion of said lengthwise edge of said attachment bar being joined to said rear edge of said center portion, said attachment bar configured to be folded upwardly onto a rear of the animal's foot, at least a portion of attachment bar being configured to be bonded to the side of the animal's foot.

2. A bandage according to claim 1, wherein said center portion has a width and a length associated therewith, said width and said length both being greater than 3 inches.

3. A bandage according to claim 2, wherein said width and said length are both less than 7 inches.

4. A bandage according to claim 1, wherein said tabs extend radially outwardly from said arcuate section of said perimeter.

5. A bandage according to claim 1, wherein at least some of said tabs are configured as truncated triangles with the base of each truncated triangle adjacent said perimeter.

6. A bandage according to claim 1, wherein said generally straight section of said perimeter has a length associated therewith, said length extending between said ends of said arcuate section, said length of said attachment bar being greater than said length of said generally straight section, said attachment bar extending beyond said ends to define a pair of attachment portions.

7. A bandage according to claim 1, wherein said center portion, said tabs, and said attachment bar comprise a body of bandage material, said bandage material being a non-woven synthetic material.

8. A bandage according to claim 7, wherein said non-woven synthetic material is a needled polypropylene material.

9. A bandage according to claim 8, wherein said needled polypropylene material has a weight between 6 and 14 ounces per square foot.

10. A bandage according to claim 8, wherein said needled polypropylene material has a weight between 9 and 11 ounces per square foot.

11. A bandage according to claim 1, wherein said center portion, said tabs, and said attachment bar comprise a body of bandage material, said bandage further comprising a layer of adhesive disposed on at least a portion of said bandage material.

12. A bandage according to claim 11, further comprising a removable release layer disposed on said adhesive layer, said release layer configured to be removed from said bandage prior to disposing said bandage on the animal's foot.

13. A bandage according to claim 1, wherein said center portion, said tabs, and said attachment bar comprise a body of bandage material, said bandage further comprising a moisture barrier layer disposed on at least a portion of said bandage material.

* * * * *

UNITED STATES PATENT AND TRADEMARK OFFICE
CERTIFICATE OF CORRECTION

PATENT NO. : 6,122,901
DATED : Sept. 26, 2000
INVENTOR(S) : Elaine S. Schultz, Karen M. Magner It is certified that error appears in the above-identified patent and that said Letters Patent is hereby corrected as shown below:

Front Page, Inventors - After Karen M. Magner, 2356 E. Cook Rd., Delete "Grand Blane" and replace with --Grand Blanc--.

Column 5, line 4 - Replace "nonwoven" with --non-woven--.

Signed and Sealed this

First Day of May, 2001

Attest:

NICHOLAS P. GODICI

Attesting Officer     Acting Director of the United States Patent and Trademark Office